(12) United States Patent
Scott et al.

(10) Patent No.: US 8,863,531 B2
(45) Date of Patent: Oct. 21, 2014

(54) COOLING APPARATUS FOR A MID-TURBINE FRAME

(75) Inventors: Jonathan Ariel Scott, Tolland, CT (US); Jorge I. Farah, Hartford, CT (US); John E. Wilber, East Hampton, CT (US); David T. Feindel, Ellington, CT (US); Kalpendu J. Parekh, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 245 days.

(21) Appl. No.: 13/539,827

(22) Filed: Jul. 2, 2012

(65) Prior Publication Data

US 2014/0000284 A1    Jan. 2, 2014

(51) Int. Cl.
*F02C 7/12*  (2006.01)
*F02C 7/20*  (2006.01)
*F03B 11/00* (2006.01)
*F03D 11/00* (2006.01)
*F03D 11/04* (2006.01)
*F02C 7/18*  (2006.01)
*F01D 9/06*  (2006.01)

(52) U.S. Cl.
CPC . *F02C 7/18* (2013.01); *F01D 9/065* (2013.01); *Y02T 50/675* (2013.01)
USPC ............... 60/806; 60/797; 415/115; 415/116; 415/142

(58) Field of Classification Search
USPC .................... 60/806, 797; 415/115–117, 142; 137/599.01, 599.14
See application file for complete search history.

(56) References Cited

U.S. PATENT DOCUMENTS

| | | | | |
|---|---|---|---|---|
| 3,369,366 | A | * | 2/1968 | Howald .......................... 60/770 |
| 3,628,880 | A | * | 12/1971 | Smuland et al. .............. 415/175 |
| 4,987,736 | A | * | 1/1991 | Ciokajlo et al. ................ 60/797 |
| 5,224,818 | A | * | 7/1993 | Drerup et al. ................. 415/115 |
| 5,292,227 | A | | 3/1994 | Czachor et al. |
| 5,482,431 | A | | 1/1996 | Taylor |
| 5,645,397 | A | | 7/1997 | Soechting et al. |

(Continued)

FOREIGN PATENT DOCUMENTS

JP        08135969        5/1996

OTHER PUBLICATIONS

International Search Report and Written Opinion from Application Serial No. PCT/US2013/048606, mailed Oct. 7, 2013, 8 pages.

*Primary Examiner* — William H Rodriguez
*Assistant Examiner* — Scott Walthour
(74) *Attorney, Agent, or Firm* — Kinney & Lange, P.A.

(57) ABSTRACT

A cooling apparatus bifurcates and regulates cooling airflow provided to a mid-turbine frame. The cooling apparatus includes a flow metering tube and a metering plate. The flow metering tube includes a top portion and a tube portion, wherein the top portion includes a first central aperture that directs a first cooling airflow into the tube portion and a first plurality of apertures located circumferentially around the central aperture that directs a second cooling airflow to a portion outside the tube portion. The metering plate is located on the top portion of the flow metering tube, wherein the metering plate includes a second central aperture aligned with the central aperture of the flow metering tube and a second plurality of apertures located circumferentially around the central aperture, wherein a size of the second central aperture meters the first cooling airflow and a size and number of the second plurality of apertures meters the second cooling airflow.

13 Claims, 4 Drawing Sheets

(56) References Cited

U.S. PATENT DOCUMENTS

| | | |
|---|---|---|
| 6,217,279 B1 * | 4/2001 | Ai et al. .................. 415/110 |
| 6,398,485 B1 * | 6/2002 | Frosini et al. ............. 415/115 |
| 6,416,275 B1 | 7/2002 | Itzel et al. |
| 6,733,229 B2 | 5/2004 | Burdick et al. |
| 8,091,371 B2 * | 1/2012 | Durocher et al. .............. 60/796 |
| 2006/0005546 A1 * | 1/2006 | Orlando et al. ............... 60/782 |
| 2006/0123796 A1 | 6/2006 | Aycock et al. |
| 2013/0192267 A1 * | 8/2013 | Sanchez et al. ............... 60/806 |
| 2014/0003920 A1 * | 1/2014 | Scott ........................ 415/177 |

\* cited by examiner

COOLING APPARATUS FOR A MID-TURBINE FRAME

BACKGROUND

The present invention is related to cooling of gas turbine engines and in particular to a cooling apparatus that bifurcates and meters cooling airflow.

Aircraft engines operate by compressing and combusting airflow, to create a hot, expanding gas that provides propulsion and power to the aircraft. However, the combustion process generates very high temperatures within the engine, which can lead to thermal growth problems within the engine. To mitigate the effects, aircraft systems extract and distribute cooling airflow to various parts of the engine.

SUMMARY

The following are non-exclusive descriptions of possible embodiments of the present invention.

A cooling apparatus for a gas turbine engine according to an exemplary embodiment of this disclosure, among other possible things includes a flow metering tube and a metering plate. The flow metering tube includes a top portion and a tube portion, wherein the top portion includes a first central aperture that directs a first cooling airflow into the tube portion and a first plurality of apertures located circumferentially around the central aperture that directs a second cooling airflow to a portion outside the tube portion. The metering plate is located on the top portion of the flow metering tube, wherein the metering plate includes a second central aperture aligned with the central aperture of the flow metering tube and a second plurality of apertures located circumferentially around the central aperture, wherein a size of the second central aperture meters the first cooling airflow and a size and number of the second plurality of apertures meters the second cooling airflow.

In a further embodiment, the top portion of the flow metering tube may include a plurality of gaps on an outer diameter, and the metering plate includes a plurality of tabs on an outer diameter, wherein the metering plate is prevented from rotating by engaging the plurality of tabs within the plurality of gaps.

A further embodiment of any of the foregoing embodiments decreases the size of the second central aperture to decrease the flow of the first cooling airflow provided to the tube portion.

A further embodiment of any of the foregoing embodiments decreases the size of the second plurality of apertures to decrease flow of the second cooling airflow provided to outside the tube portion.

In a further embodiment of any of the foregoing embodiments, the tube portion of the flow metering tube may provide the first cooling airflow to a hollow cooling rod that communicates the first cooling airflow to an inner portion of the mid-turbine frame.

In a further embodiment of any of the foregoing embodiments, the tube portion of the flow metering tube may provide the first cooling airflow to a hollow cooling rod that communicates the first cooling airflow to an inner portion of the mid-turbine frame.

A cooling system for a mid-turbine frame of a gas turbine engine according to an exemplary embodiment of this disclosure, among other possible things includes an outer case, an inner hub, a hollow cooling rod that extends from the inner hub to the outer case. A fastener mechanically attaches the hollow cooling rod to the outer case and has a hollow portion and side apertures located on a side portion of the fastener for delivering cooling airflow to a portion adjacent the outer case, and a flow metering tube positioned within the hollow portion of the fastener. The flow metering tube has a top portion and a tube portion that is coupled with the hollow cooling rod, wherein the top portion includes a first central aperture that directs a first cooling airflow into the tube portion for supply to the hollow cooling rod and an inner diameter location, and a first plurality of apertures located circumferentially around the central aperture that directs a second cooling airflow to the hollow portion of the fastener for supply via the side apertures to the outer diameter location.

In a further embodiment, the cooling system may include a metering plate located on the top portion of the flow metering tube, wherein the metering plate includes a second central aperture aligned with the central aperture of the flow metering tube and a second plurality of apertures located circumferentially around the central aperture, wherein a size of the second central aperture meters the first cooling airflow and a size and number of the second plurality of apertures meters the second cooling airflow.

In a further embodiment of any of the foregoing embodiments, the top portion of the flow metering tube may include a plurality of gaps on an outer diameter, and the metering plate includes a plurality of tabs on an outer diameter, wherein the metering plate is prevented from rotating by engaging the plurality of tabs within the plurality of gaps.

In a further embodiment of any of the foregoing embodiments, decreasing the size of the second central aperture decreases flow of the first cooling airflow provided to the tube portion.

In a further embodiment of any of the foregoing embodiments, decreasing the size of the second plurality of apertures decreases flow of the second cooling airflow provided to outside the tube portion.

In a further embodiment of any of the foregoing cooling systems, wherein the fastener may be an outer diameter (OD) hex nut.

In a further embodiment of any of the foregoing embodiments, the cooling systems may further include an external manifold attached to the OD hex nut that holds the metering plate in place on top of the flow metering tube, and a cooling pipe that supplies cooling airflow to the external manifold for bifurcation and metering by the flow metering tube and the metering plate.

DETAILED DESCRIPTION

Figure 1:
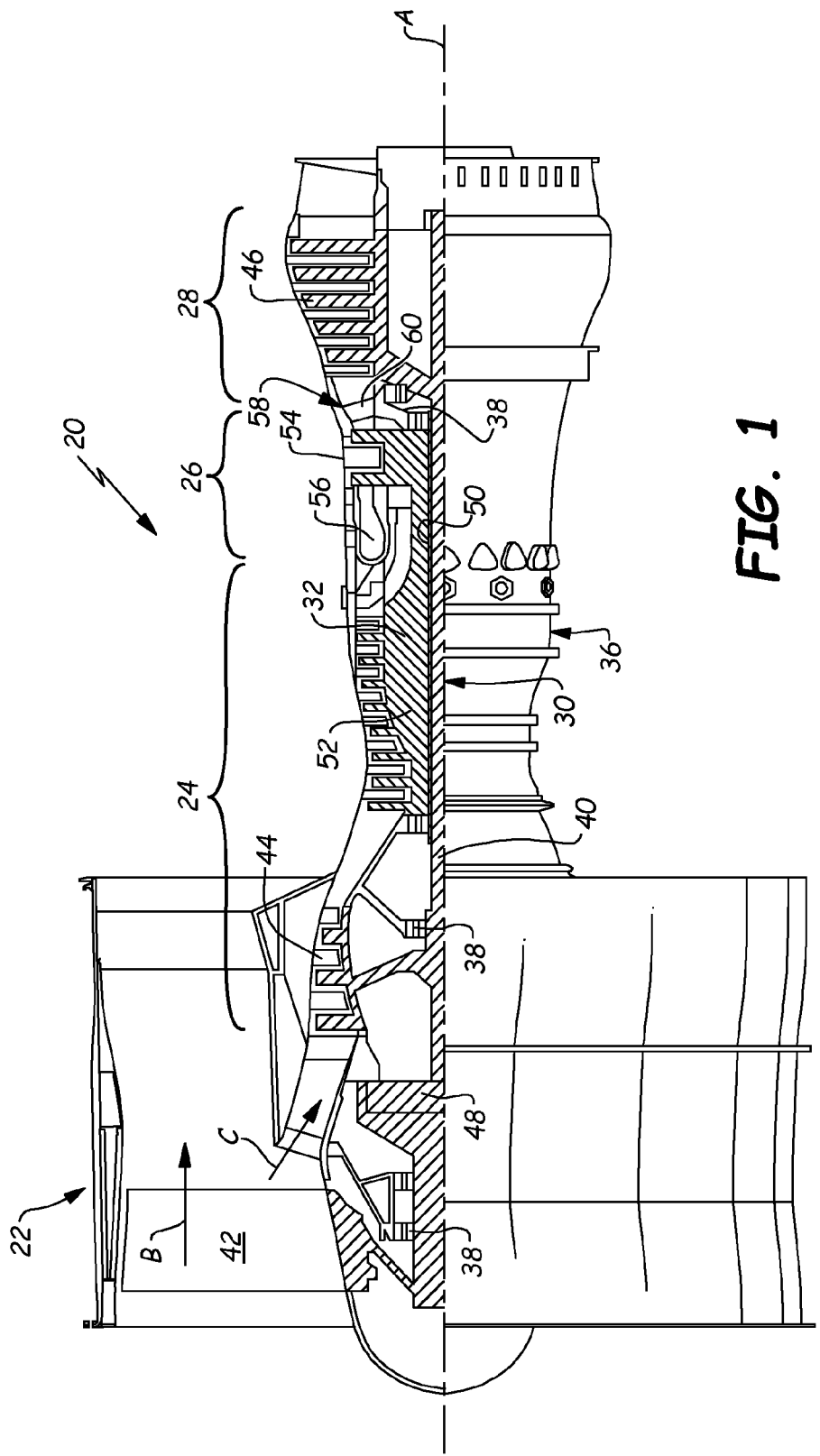
FIG. 1 is a schematic, cross-sectional view of a gas turbine engine according to an embodiment of the present invention.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (1bm) of fuel per hour being burned divided by pound-force (1bf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }°R)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
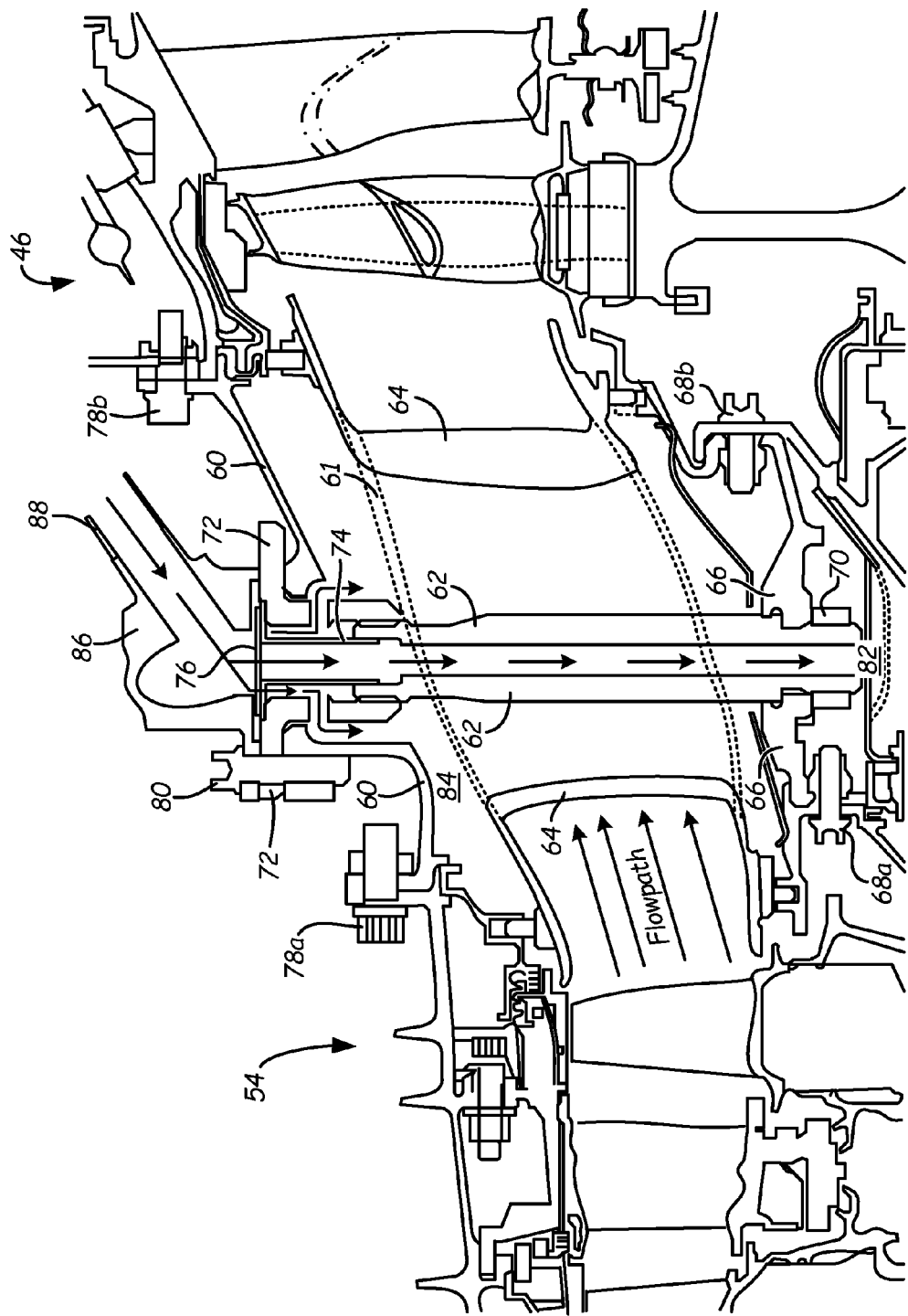
FIG. 2 is a cross-sectional view of the mid-turbine frame portion of the gas turbine engine according to an embodiment of the present invention.

FIG. 2 is a cross-sectional view of mid-turbine frame 58 according to an embodiment of the present invention. In the embodiment shown in FIG. 2, mid-turbine frame 58 includes outer case portion 60, outer flowpath wall 61, hollow cooling rod 62, stationary vane 64, inner hub portion 66, inner bolts 68a and 68b, inner diameter i-rod nut 70, outer diameter nut 72, metering tube 74, metering plate 76, outer bolts 78a, 78b, and anti-rotation bolt 80. One of the functions of mid-turbine frame 58 is to provide cooling airflow to desired portions of the engine, including an inner diameter portion 82 and an outer diameter portion 84. Metering tube 74 and metering plate 76 provide bifurcation and direction of cooling airflow to desired portions of the engine, as discussed in more detail below.

As discussed with respect to FIG. 1, mid-turbine frame 58 is located between high-pressure turbine section 54 and low-pressure turbine section 46. Outer case 60 of mid-turbine frame 58 is bolted via bolt outer 78a to high-pressure turbine section 54, and via bolt 78b to low-pressure turbine section 46. Outer flowpath wall 61 defines a flowpath (labeled 'flowpath') for exhaust air provided by combustor 56 (shown in FIG. 1) via high-pressure turbine section 54. Outer diameter portion 84 is defined as the area between outer case 60 and outer flowpath wall 61. Within the flowpath defined by outer flowpath wall 61, stationary guide vanes 64 are positioned to direct the flow of exhaust air from high-pressure turbine section 54 to low-pressure turbine section 46. Hollow cooling rod 62 is located within stationary vane 64. Hollow cooling rod 62 provides structural support for mid-turbine frame 58, in particular by communicating loads from the rotor to engine case 60. In addition, hollow cooling rod 62 distributes cooling airflow from the outer diameter to inner diameter portion 82 located radial inward of inner hub 66.

In the embodiment shown in FIG. 2, hollow cooling rod 62 is secured to outer case 60 via fastener 72. In this embodiment the fastener is an outer diameter (OD) hex nut 72. In particular, OD hex nut 72 is screwed onto an outer diameter portion of hollow cooling rod 62, and secured via anti-rotation bolt 80 to outer case 60. Flow metering tube 74 fits within an inner diameter of OD hex nut 72 and includes a top portion at a radially outward end that rests against OD hex nut 72 and a hollow portion that extends radially inward toward hollow cooling rod 62. In addition, metering plate 76 rests on a top portion of flow metering tube 74. The combination of metering plate 76 and flow metering tube 74 bifurcates and meters cooling airflow, with a first portion of the cooling airflow extending radially inward through hollow cooling rod 62 to inner diameter portion 82 and a second portion of cooling airflow directed through apertures in OD hex nut 72 to a outer diameter portion 84.

Figure 3:
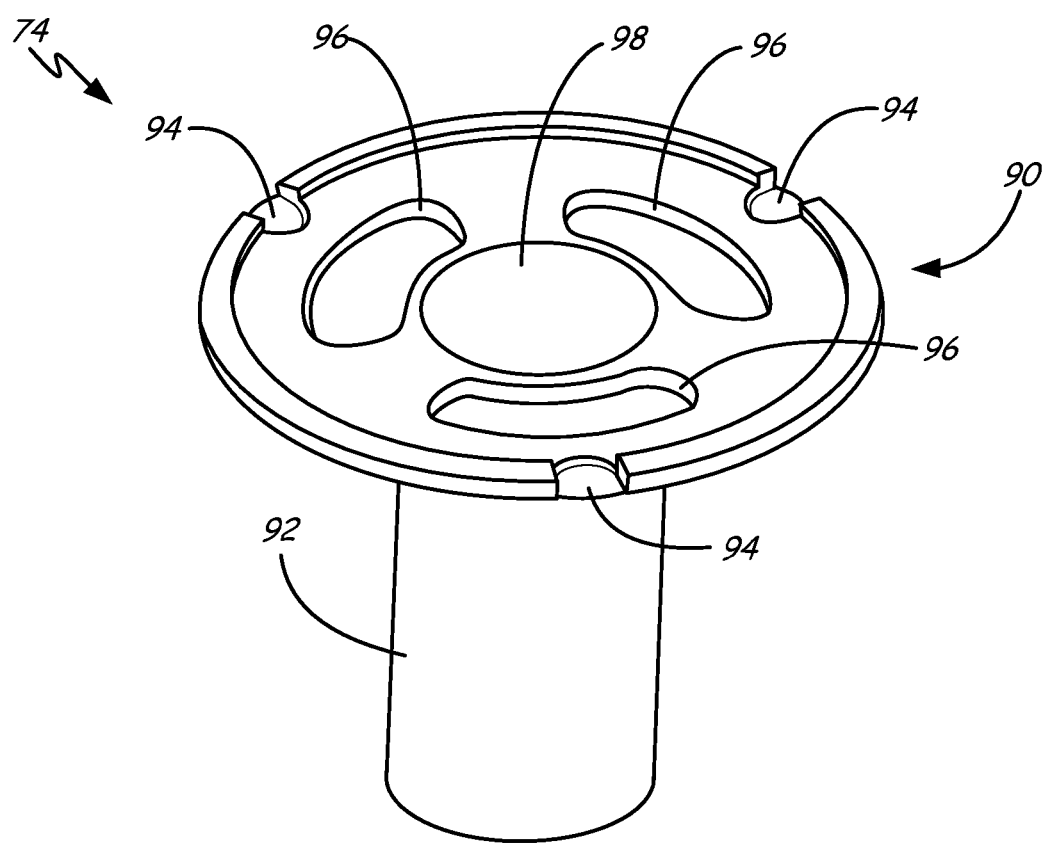
FIG. 3 is an isometric view of the flow metering tube according to an embodiment of the present invention.
Figure 4B:
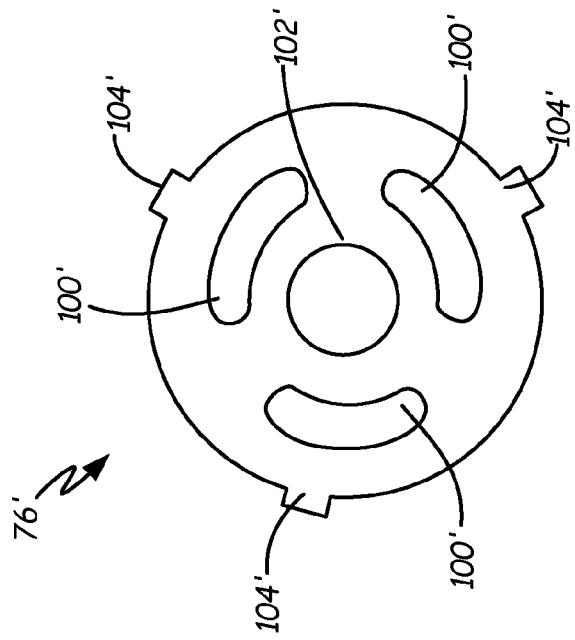
FIGS. 4A and 4B are top views of the metering plate according to an embodiment of the present invention.

As shown in more detail with respect to FIGS. 3-4B, flow metering tube 74 includes at least one aperture for directing cooling airflow though tube portion into hollow cooling rod 62 and at least one other aperture for directing cooling airflow outside of the tube portion through apertures located on a side portion of OD hex nut 72. Flow metering tube 74 therefore provides bifurcation. Flow metering plate 76, located on a top portion of flow metering tube 74, also includes a plurality of apertures aligned with one or more apertures associated with flow metering tube 74, wherein the size of the apertures provided on metering plate 76 determines the amount of cooling airflow provided to each portion.

In the embodiment shown in FIG. 2, flow metering tube 74 and flow metering plate 76 are not secured directly to OD hex nut 72, outer case 60, or manifold 86. Rather, manifold 86 (which deliver cooling airflow from cooling pipe 88 to flow metering tube 74 and metering plate 76) is bolted via anti-rotation bolt 80 to case 60 via OD hex nut 72. In this way, flow metering tube 74 and flow metering plate 76 are held in place between manifold 86 and OD hex nut 72. A benefit of this approach is metering tube 74 and metering plate 76 can be easily accessed, inspected, and replaced by removing manifold 86.

FIG. 3 is an isometric view of flow metering tube 74 according to embodiment of the present invention. Flow metering tube 74 includes top portion 90 and tube portion 92. Top portion 90 includes a plurality of gaps 94 on an outer diameter of top portion 90 that are positioned to receive tabs associated with metering plate 76. The combination of gaps 94 and tabs prevent metering plate 76 (shown in FIGS. 4A, 4B) from moving from a desired position relative to flow metering tube 74.

Flow metering tube 74 also includes a plurality of apertures 96 located circumferentially around an outer diameter of flow metering tube 74, and central aperture 98. The plurality of apertures 96 extend through top portion 90, such that cooling airflow provided through apertures 96 is not provided to tube portion 88. Central aperture 98 provides a flow path through tube portion 92, to provide cooling airflow to hollow cooling rod 62 (shown in FIG. 2). The combination of apertures 96, central aperture 98, and tube portion 92 bifurcate cooling airflow for provision to different locations.

Figure 4A:
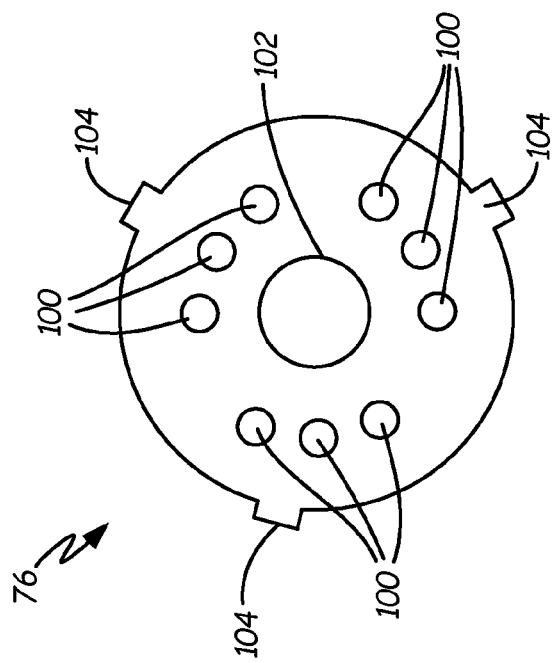

FIGS. 4A-4B are isometric views of flow metering plate 76 according to different embodiments of the present invention. For purposes of clarity, the flow metering plate shown in FIG. 4B and all associated elements of the flow metering plate, are labeled with prime notation (e.g., flow metering plate 76'). Flow metering plates 76, 76' determine the rate at which cooling airflow is delivered. For example, metering plate 76 includes a plurality of apertures 100 located circumferentially around an outer diameter of metering plate 76, wherein the size of each aperture determines the rate at which cooling airflow is provided to a first location. Similarly, central aperture 102 is centrally located on metering plate 76, wherein the size of central aperture 102 determines the rate at which cooling airflow is provided to tube portion 92, and into hollow cooling rod 62. Similarly, metering plate 76' shown in FIG. 4B includes a plurality of apertures 100' located circumferentially around an outer diameter of metering plate 76', wherein the size of each aperture determines the rate at which cooling airflow is provided to a first location. Central aperture 102' is similarly centrally located on metering plate 76', wherein the size of central aperture 102' determines the rate at which cooling airflow is provided to tube portion 92, and into hollow cooling rod 62.

Tab portions 104 and 104' located around the outer circumference of metering plates 76 and 76', respectively, engage with gap portions 94 associated with flow metering tube 92 (shown in FIG. 3) to hold metering plates 76, 76' in place. Manifold 86 is placed over the top of a metering plate 76, 76', and secured to OD hex nut 72 such that flow metering tube 74 and a flow metering plate 76, 76', while not secured to the outer case or OD hex nut 72, are held in place between manifold 86 and OD hex nut 72.

A benefit of the present invention is that the flow rate of cooling airflow can be modified by changing the metering plate design employed. For example, FIGS. 4A and 4B illustrate metering plates having different aperture configurations that result in different rates of cooling air being provided. In addition, because metering plate 76 is held in place between manifold 86 and OD hex nut 72, and not bolted or otherwise mechanically attached, changing metering plates is mechanically easy.

In this way, the present invention provides an apparatus for bifurcating and metering cooling airflow. In particular, the claimed invention utilizes a flow metering tube and a metering plate, wherein the metering plate has a configuration of apertures that determine the flow rate of cooling airflow. The metering plate is removably attached to the flow metering tube, such that the metering plate can be replaced with another metering plate having a different configuration of apertures to vary the flow rate of cooling airflow.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A cooling apparatus that bifurcates and regulates cooling airflow provided to a mid-turbine frame, the cooling apparatus comprising:
   a flow metering tube having a top portion and a tube portion, wherein the top portion includes a first central aperture that directs a first cooling airflow into the tube portion and a first plurality of apertures located circumferentially around the first central aperture that directs a second cooling airflow to a portion outside the tube portion; and
   a metering plate located on the top portion of the flow metering tube, wherein the metering plate includes a second central aperture aligned with the first central aperture of the flow metering tube and a second plurality of apertures located circumferentially around the second central aperture, wherein a size of the second central aperture meters the first cooling airflow and a size and number of the second plurality of apertures meters the second cooling airflow;
   wherein the tube portion of the flow metering tube provides the first cooling airflow to a hollow cooling rod that communicates the first cooling airflow to an inner portion of the mid-turbine frame.

2. The cooling apparatus of claim 1, wherein the top portion of the flow metering tube includes a plurality of gaps on an outer diameter, and the metering plate includes a plurality of tabs on an outer diameter, wherein the metering plate is prevented from rotating by engaging the plurality of tabs within the plurality of gaps.

3. The cooling apparatus of claim 1, wherein the size of the second central aperture determines flow of the first cooling airflow provided to the tube portion.

4. The cooling apparatus of claim 1, wherein the size of the second plurality of apertures determines flow of the second cooling airflow provided to the portion outside the tube portion.

5. A cooling apparatus that bifurcates and regulates cooling airflow provided to a mid-turbine frame, the cooling apparatus comprising:
   a flow metering tube having a top portion and a tube portion, wherein the top portion includes a first central aperture that directs a first cooling airflow into the tube portion and a first plurality of apertures located circumferentially around the first central aperture that directs a second cooling airflow to a portion outside the tube portion; and
   a metering plate located on the top portion of the flow metering tube, wherein the metering plate includes a second central aperture aligned with the first central aperture of the flow metering tube and a second plurality of apertures located circumferentially around the second central aperture, wherein a size of the second central aperture meters the first cooling airflow and a size and number of the second plurality of apertures meters the second cooling airflow;
   wherein the top portion of the flow metering tube includes a plurality of gaps on an outer diameter, and the metering plate includes a plurality of tabs on an outer diameter, wherein the metering plate is prevented from rotating by engaging the plurality of tabs within the plurality of gaps.

6. The cooling apparatus of claim 5, wherein the size of the second central aperture determines flow of the first cooling airflow provided to the tube portion.

7. The cooling apparatus of claim 5, wherein the size of the second plurality of apertures determines flow of the second cooling airflow provided to the portion outside the tube portion.

8. A cooling system for a mid-turbine frame, the cooling system comprising:
   an outer case;
   an inner hub;
   a hollow cooling rod that extends from the inner hub to the outer case;
   a fastener that mechanically attaches the hollow cooling rod to the outer case and has a hollow portion and side apertures located on a side portion of the fastener for delivering cooling airflow to a portion adjacent the outer case;
   a flow metering tube positioned within the hollow portion of the fastener, the flow metering tube having a top portion and a tube portion that is coupled with the hollow cooling rod, wherein the top portion includes a first central aperture that directs a first cooling airflow into the tube portion for supply to the hollow cooling rod and an inner diameter location, and a first plurality of apertures located circumferentially around the first central aperture that directs a second cooling airflow to the hollow portion of the fastener for supply via the side apertures to the portion adjacent the outer case; and
   a metering plate located on the top portion of the flow metering tube, wherein the metering plate includes a second central aperture aligned with the first central aperture of the flow metering tube and a second plurality of apertures located circumferentially around the second central aperture, wherein a size of the second central aperture meters the first cooling airflow and a size and number of the second plurality of apertures meters the second cooling airflow.

9. The cooling system of claim 8, wherein the top portion of the flow metering tube includes a plurality of gaps on an outer diameter, and the metering plate includes a plurality of tabs on an outer diameter, wherein the metering plate is prevented from rotating by engaging the plurality of tabs within the plurality of gaps.

10. The cooling system of claim 8, wherein the size of the second central aperture determines flow of the first cooling airflow provided to the tube portion.

11. The cooling system of claim 8, wherein the size of the second plurality of apertures determines flow of the second cooling airflow provided to the portion adjacent the outer case.

12. The cooling system of claim 8, wherein the fastener is a nut.

13. The cooling system of claim 12, further including:
   an external manifold attached to the nut that holds the metering plate in place on top of the flow metering tube; and
   a cooling pipe that supplies cooling airflow to the external manifold for bifurcation and metering by the flow metering tube and the metering plate.

* * * * *